US010296281B2

(12) United States Patent
Prosserman et al.

(10) Patent No.: US 10,296,281 B2
(45) Date of Patent: May 21, 2019

(54) HANDHELD MULTI VANTAGE POINT PLAYER

(71) Applicant: LiveStage, Inc., New York, NY (US)

(72) Inventors: Jeff Prosserman, New York, NY (US); Kristopher King, Hermosa Beach, CA (US)

(73) Assignee: Livestage, Inc. NY (US)

( * ) Notice: Subject to any disclaimer, the term of this patent is extended or adjusted under 35 U.S.C. 154(b) by 333 days.

(21) Appl. No.: 14/941,582

(22) Filed: Nov. 14, 2015

(65) Prior Publication Data

US 2016/0073013 A1    Mar. 10, 2016

Related U.S. Application Data

(63) Continuation-in-part of application No. 14/719,636, filed on May 22, 2015, which is a continuation-in-part
(Continued)

(51) Int. Cl.
*G06F 3/16* (2006.01)
*H04N 5/247* (2006.01)
(Continued)

(52) U.S. Cl.
CPC ............ G06F 3/162 (2013.01); G11B 27/031 (2013.01); G11B 27/10 (2013.01); H04N 5/247 (2013.01); H04S 7/302 (2013.01); H04N 5/222 (2013.01); H04N 5/23238 (2013.01); H04N 5/268 (2013.01); H04N 7/066 (2013.01); H04N 2005/4423 (2013.01); H04N 2005/4428 (2013.01); H04N 2005/44578 (2013.01); H04S 2400/15 (2013.01)

(58) Field of Classification Search
None
See application file for complete search history.

(56) References Cited

U.S. PATENT DOCUMENTS 6,049,622 A    4/2000 Robb et al.
6,346,938 B1   2/2002 Chan et al.
(Continued)

OTHER PUBLICATIONS

Liu, Yung-Tien and Li, Bo-Jheng, Department of Mechanical and Automation Engineering, National Kaohsiung First University of Science and Technology (First Tech), No. 1, University Rd., Yanchao 824, Kaohsiung, Taiwan, ROC, In Precision Engineering Oct. 2016 46:118-128.*

*Primary Examiner* — William C Vaughn, Jr.
*Assistant Examiner* — Daniel T Tekle
(74) *Attorney, Agent, or Firm* — Rogers Towers, P.A.; Joseph P. Kincart

(57) ABSTRACT

The present invention relates to methods and apparatus for utilizing a portable handheld device for viewing streaming video captured from multiple vantage points. More specifically, the present invention presents methods and apparatus for controlling the immersive experience through player configurations for viewing image data captured in two dimensional or three dimensional data formats and from multiple disparate points of capture based on venue specific characteristics, wherein the viewing experience may emulate observance of an event from at least two of the multiple points of capture in specifically chosen locations of a particular venue.

15 Claims, 10 Drawing Sheets

Related U.S. Application Data of application No. 14/689,922, filed on Apr. 17, 2015, which is a continuation-in-part of application No. 14/687,752, filed on Apr. 15, 2015, which is a continuation-in-part of application No. 14/532,659, filed on Nov. 4, 2014.

(60) Provisional application No. 62/080,386, filed on Nov. 16, 2014, provisional application No. 62/002,656, filed on May 23, 2014, provisional application No. 61/981,817, filed on Apr. 20, 2014, provisional application No. 61/981,416, filed on Apr. 18, 2014, provisional application No. 61/900,093, filed on Nov. 5, 2013.

(51) Int. Cl.
*G11B 27/031* (2006.01)
*G11B 27/10* (2006.01)
*H04S 7/00* (2006.01)
*H04N 5/268* (2006.01)
*H04N 5/222* (2006.01)
*H04N 5/232* (2006.01)
*H04N 7/06* (2006.01)
*H04N 5/44* (2011.01)
*H04N 5/445* (2011.01)

(56) References Cited

U.S. PATENT DOCUMENTS

| | | |
|---|---|---|
| 6,400,903 B1 | 6/2002 | Conoval |
| 6,842,719 B1 | 1/2005 | Fitzpatrick et al. |
| 7,814,436 B2 | 10/2010 | Schrag et al. |
| 8,588,432 B1 | 11/2013 | Simon |
| 2002/0008203 A1 | 1/2002 | Chang |
| 2002/0046405 A1 | 4/2002 | Lahr |
| 2002/0104920 A1 | 8/2002 | Thompson et al. |
| 2002/0191071 A1 | 12/2002 | Rui et al. |
| 2003/0035386 A1 | 2/2003 | Sullivan |
| 2003/0204850 A1 | 10/2003 | Ng et al. |
| 2003/0210329 A1 | 11/2003 | Aagaard et al. |
| 2004/0030425 A1 | 2/2004 | Yeakel et al. |
| 2004/0036798 A1 | 2/2004 | Saito et al. |
| 2005/0035386 A1 | 2/2005 | Ha et al. |
| 2005/0136832 A1 | 6/2005 | Spreizer |
| 2005/0246751 A1 | 11/2005 | Boyce et al. |
| 2005/0260948 A1 | 11/2005 | Regulinski et al. |
| 2006/0206408 A1* | 9/2006 | Nassiri ............... G06Q 30/0617 705/37 |
| 2006/0224761 A1 | 10/2006 | Howarth et al. |
| 2006/0277576 A1 | 12/2006 | Acharya et al. |
| 2007/0021058 A1 | 1/2007 | Arseneau et al. |
| 2007/0044133 A1 | 2/2007 | Hodecker |
| 2007/0188712 A1 | 8/2007 | Kutner |
| 2007/0204300 A1 | 8/2007 | Markley et al. |
| 2008/0238916 A1 | 10/2008 | Ghosh et al. |
| 2008/0307948 A1 | 12/2008 | Minarik |
| 2009/0009605 A1* | 1/2009 | Ortiz ..................... H04N 5/232 348/157 |
| 2009/0085740 A1 | 4/2009 | Klein et al. |
| 2009/0089065 A1 | 4/2009 | Buck et al. |
| 2009/0128568 A1 | 5/2009 | Gloudemans et al. |
| 2009/0189981 A1 | 7/2009 | Siann et al. |
| 2009/0238263 A1 | 9/2009 | Jaggi et al. |
| 2010/0026809 A1 | 2/2010 | Curry |
| 2010/0138874 A1 | 6/2010 | Deutschman |
| 2010/0195623 A1 | 8/2010 | Narasimhan et al. |
| 2010/0231695 A1 | 9/2010 | DeCusatis et al. |
| 2010/0245532 A1 | 9/2010 | Kurtz et al. |
| 2010/0259595 A1 | 10/2010 | Trimeche et al. |
| 2010/0271951 A1 | 10/2010 | Dujardin et al. |
| 2010/0290638 A1 | 11/2010 | Heineman |
| 2011/0018997 A1 | 1/2011 | Ortiz et al. |
| 2011/0249100 A1 | 10/2011 | Jayaram et al. |
| 2011/0270135 A1* | 11/2011 | Dooley ................. A61B 5/1114 600/595 |
| 2011/0280540 A1 | 11/2011 | Woodman |
| 2012/0078667 A1 | 3/2012 | Denker et al. |
| 2012/0113264 A1 | 5/2012 | Moshrefi et al. |
| 2012/0169882 A1 | 7/2012 | Millar et al. |
| 2012/0207345 A1* | 8/2012 | Tang ...................... G06F 3/017 382/103 |
| 2012/0320196 A1 | 12/2012 | Overton et al. |
| 2012/0327179 A1 | 12/2012 | Watson et al. |
| 2013/0171596 A1* | 7/2013 | French ................... G09B 19/00 434/236 |
| 2013/0194427 A1 | 8/2013 | Hunter |
| 2013/0194495 A1 | 8/2013 | Pan |
| 2013/0342757 A1 | 12/2013 | Brown et al. |
| 2014/0038515 A1 | 2/2014 | Avellan et al. |
| 2014/0038708 A1 | 2/2014 | Davison et al. |
| 2014/0139386 A1 | 5/2014 | Liu et al. |
| 2014/0150042 A1 | 5/2014 | Pacor et al. |
| 2014/0152834 A1 | 6/2014 | Kosseifi et al. |
| 2014/0156459 A1 | 6/2014 | Zises |
| 2014/0267747 A1 | 9/2014 | Kritt et al. |
| 2014/0282748 A1 | 9/2014 | McNamee et al. |
| 2014/0320662 A1 | 10/2014 | McNamee et al. |
| 2015/0057779 A1 | 2/2015 | Saungsomboon et al. |

* cited by examiner

800

820

850

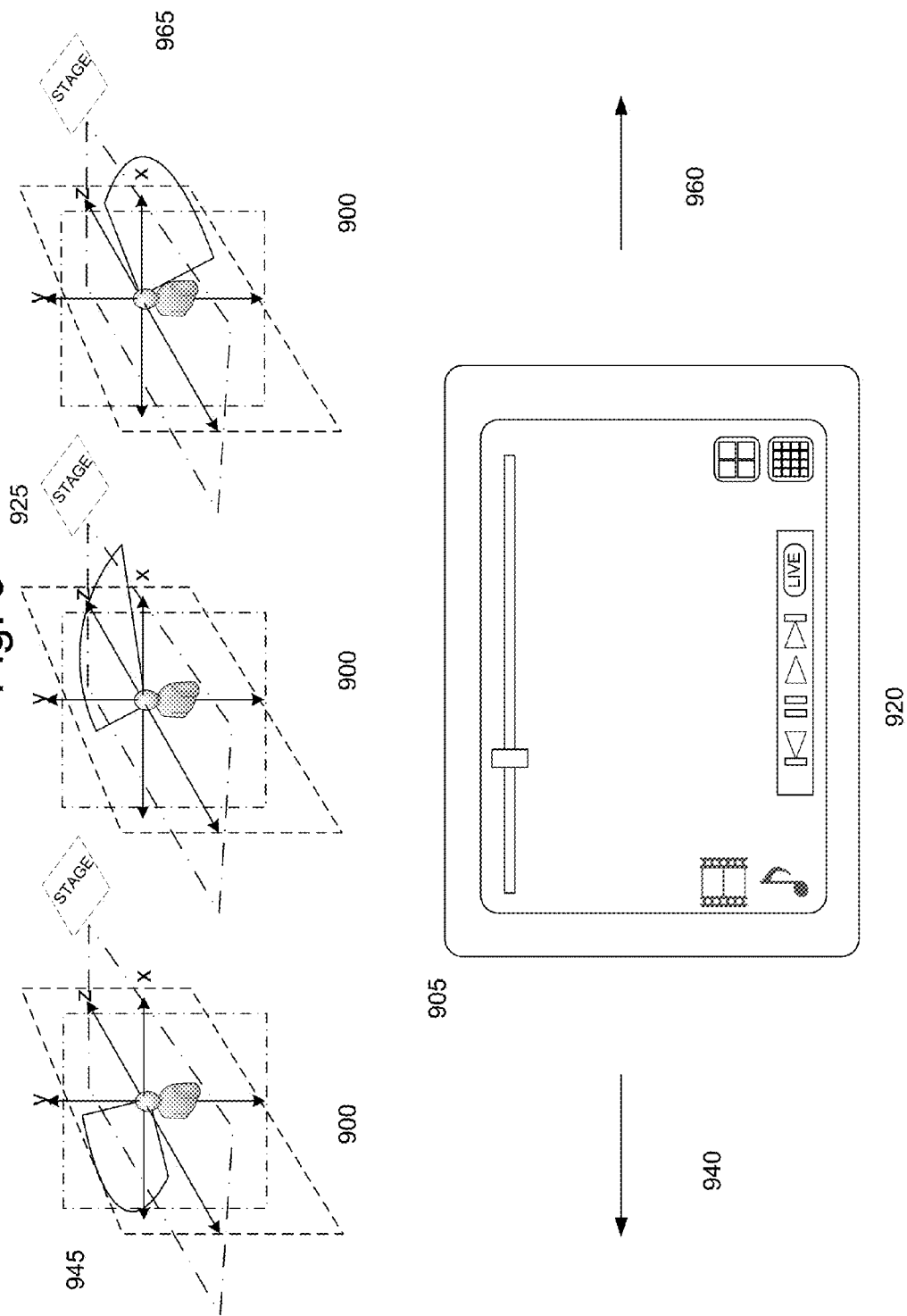

HANDHELD MULTI VANTAGE POINT PLAYER

CROSS-REFERENCE TO RELATED APPLICATIONS

This application claims priority to U.S. Provisional Patent Application Ser. No. 62/080,386, filed Nov. 16, 2014, and titled "HANDHELD MULTI-VANTAGE POINT PLAYER", the entire contents of which are incorporated herein by reference. This application is also a continuation-in-part to the U.S. patent application with Ser. No. 14/719,636, filed May 22, 2015, titled "EVENT SPECIFIC DATA CAPTURE FOR MULTI-POINT IMAGE CAPTURE SYSTEMS." This application is also a continuation-in-part to the U.S. patent application with Ser. No. 14/096,869, filed Dec. 4, 2013, titled "MULTIPLE VANTAGE POINT VIEWING PLATFORM AND USER INTERFACE." This application is also a continuation-in-part to the U.S. patent application with Ser. No. 14/532,659, filed Nov. 4, 2014, titled "SWITCHABLE MULTIPLE VIDEO TRACK PLATFORM," which claims the benefit of U.S. Provisional Patent Application Ser. No. 61/900,093, filed Nov. 5, 2013, titled "SWITCHABLE MULTIPLE VIDEO TRACK PLATFORM." This application is also a continuation-in-part to the U.S. patent application with Ser. No. 14/687,752, filed Apr. 15, 2015, titled "VENUE SPECIFIC MULTI POINT IMAGE CAPTURE," which claims the benefit of U.S. Provisional Patent Application Ser. No. 61/981,416, filed Apr. 18, 2014, titled "VENUE SPECIFIC MULTI POINT IMAGE CAPTURE." This application is also a continuation-in-part to the U.S. patent application with Ser. No. 14/689,922, filed Apr. 17, 2015, titled "AUDIO CAPTURE FOR MULTI POINT IMAGE CAPTURE SYSTEMS," which claims the benefit of U.S. Provisional Patent Application Ser. No. 61/981,817, filed Apr. 20, 2014, titled "AUDIO CAPTURE FOR MULTI POINT IMAGE CAPTURE SYSTEMS." The entire contents of all cross-referenced patent applications and all cross-referenced provisional patent applications are hereby incorporated by reference.

FIELD OF THE INVENTION

The present invention relates to methods and apparatus for utilizing a portable handheld device for viewing streaming video captured from multiple vantage points. More specifically, the present invention presents methods and apparatus for controlling the immersive experience through player configurations for viewing image data captured in two dimensional or three dimensional data formats and from multiple disparate points of capture based on venue specific characteristics, wherein the viewing experience may emulate observance of an event from at least two of the multiple points of capture in specifically chosen locations of a particular venue.

BACKGROUND OF THE INVENTION

Traditional methods of viewing image data generally include viewing a video stream of images in a sequential format. The viewer is presented with image data from a single vantage point at a time. Simple video includes streaming of imagery captured from a single image data capture device, such as a video camera. More sophisticated productions include sequential viewing of image data captured from more than one vantage point and may include viewing image data captured from more than one image data capture device.

As video capture has proliferated, popular video viewing forums, such as YouTube™, have arisen to allow for users to choose from a variety of video segments. In many cases, a single event will be captured on video by more than one user and each user will post a video segment on YouTube. Consequently, it is possible for a viewer to view a single event from different vantage points, However, in each instance of the prior art, a viewer must watch a video segment from the perspective of the video capture device, and cannot switch between views in a synchronized fashion during video replay. As well, the location of the viewing positions may in general be collected in a relatively random fashion from positions in a particular venue where video was collected and made available ad hoc.

Traditionally, when a party has wanted to share or view a video, the sharing and viewing party has been limited to a pre-determined vantage point chosen by a person other than the viewer. The director of the video content could sort through various vantage points and different camera angles, cut the chosen perspectives together, and create a single final video stream. Thus the extent to which a viewer could manipulate the video source was generally limited to pause, play, and volume control.

The problem with this arrangement is that the director of the video content provides a finalized product hoping to have correctly guessed the viewer's interests. If the director has misjudged the interests of the viewer, the viewer has no recourse in choosing a different angle or different vantage point.

What is needed is a product that breaks the control of the director over the viewer so that the viewer has independent choice in determining the final video stream thus giving the viewer an individualized and immersive viewing experience.

SUMMARY OF THE INVENTION

Accordingly, the present invention provides methods and apparatus for designing specific location patterns for the collection of image data in a venue specific manner.

The image data captured from multiple vantage points may be captured as one or both of: two dimensional image data or three dimensional image data. The data is synchronized such that a user may view image data from multiple vantage points, each vantage point being associated with a disparate image capture device. The data is synchronized such that the user may view image data of an event or subject at an instance in time, or during a specific time sequence, from one or more vantage points.

In some embodiments, locations of image capture apparatus may be designed in a venue specific manner based on the design aspects of a particular venue and the stage setting that is placed within the venue. It may be desirable to provide a user with multiple image capture sequences from different locations in the particular venue. One or more of stage level, back stage, orchestra, balcony, and standard named locations may be included in the set of locations for image capture apparatus. It may also be desirable to select design locations for image capture based upon a view path from a particular location to a desired focal perspective such as a typical location for a performer or participant, the location of performing equipment or a focal point for activity of a performer or performers. In other embodiments, the location of design locations may relate to a desired focal perspective relating to locations of spectators at an event.

In some exemplary embodiments, the designed locations of the image capture apparatus may be superimposed upon a spatial representation of a specific venue. Characteristics of the location including, the type of image capture device at the location, a positional reference relating to a seating reference in seating zones, or spatial parameters including distances, heights and directional information may also be presented to a user upon the superimposed spatial representation. In some embodiments, the spatial representation or virtual representation may include depictions of designed locations superimposed upon graphic representations of a venue and may be presented to a user upon a graphical display apparatus of a workstation.

In some embodiments, the virtual representation may include graphical depictions of the view that may be observed from a design location. The virtual representation may include a line of sight depiction to a focal point in the venue, or in other embodiments may allow for a flexible representation of a typical view in a set of different directional vectors from a design point. In other embodiments, the virtual representation may be chosen from a user selectable spectrum of directional possibilities. The virtual representation may in some embodiments include computer generated simulations of the view. In other embodiments, actual image data may be used to provide the virtual representation of the view from a design location.

In additional embodiments, the specific placement of image capture apparatus within a zonal region of a venue may be influenced by venue specific characteristic including but not limited to the shape and other characteristics of zones for spectators such as seating arrangement in the zone. In some embodiments, the location of obstructions such as columns, speakers, railings, and other venue specific aspects may influence the design for placement of image capture apparatus. In other embodiments, the location of viewpoints that are not typically accessible to spectators may be included in the design of venue specific image capture device placement.

In some embodiments, the placement of designed locations for image capture devices may be based upon venue specific historical data. The venue specific historical data may include the historical demand for a seating location. The demand may relate to rapidity that a location is purchased for a typical class of performances, the frequency of occupation of a particular location or a quantification of historical occupation of the location during events, as non-limiting examples. In other examples, the historical data that may be used may include historical prices of tickets paid in a primary or secondary market environment.

In some embodiments, the placement of design locations for image capture may be based upon venue specific preferences collected from spectator groups. In some embodiments, venue specific preferences may be collected by surveying spectator groups. In other embodiments, a preference election may be solicited in an interactive manner from spectator groups including in a non-limiting perspective by internet-based preference collection mechanisms. A virtual representation of a venue along with the design for a stage or other performance location and historical or designed image capture locations may be utilized in the acquisition of spectator preference collection in some embodiments.

One general aspect includes a handheld multi-vantage point player including: a display; a control system configured to access a server in logical communication with a communications network; and executable software stored on the control system and executable on demand. The software may be operative with the control system to cause the control system to provide image vantage point control including logical control over captured image data, captured from a plurality of image vantage points within a venue during a performance event. The software may be operative with the control system to cause the control system to prompt selection of one or more image vantage points. The software may be operative with the control system to cause the control system to receive input selection of the one or more image vantage point. The software may be operative with the control system to cause the control system to access the server, where the server is configured to store the captured image data for the performance event. The software may be operative with the control system to cause the control system to retrieve image data captured from the one or more selected image vantage points. The software may be operative with the control system to cause the control system to display the captured image data retrieved from the one or more image vantage points.

Implementations may include one or more of the following features. The handheld multi-vantage point player where the control system is further caused to: provide audio vantage point control including logical control over captured audio data, captured from a plurality of audio vantage points within the venue during the performance event; prompt selection of one or more audio vantage points; receive input selection of the one or more audio vantage points; access the server, where the server is configured to store the captured audio data for the performance event; retrieve audio data captured from the one or more selected audio vantage points.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 9 illustrates exemplary perspective graphs comprising three separate perspective points, wherein the three perspective graphs may illustrate horizontal movement of a handheld device, according to some embodiments of the present disclosure.

DETAILED DESCRIPTION

The present invention provides generally for the capture, use, and retention of data relating to performances in a specific venue in addition to the visual and sound data that may be recorded. Techniques to record visual and audible data may involve the use of multiple video camera arrays and audio microphones and arrays of audio microphones for the capture and processing of video and audio data that may be used to generate visualizations of live performance sound along with imagery from a multi-perspective reference. There is other data that may be collected and retained that relates to performances. Such data may include in a non-limiting sense, data related to the environment, local and general, of the performance, data related to the control sequences for support equipment, data related to the processing of audio signals and data related to the control of various lighting and special effects.

In the following sections, detailed descriptions of examples and methods of the invention will be given. The description of both preferred and alternative examples though through are exemplary only, and it is understood that to those skilled in the art that variations, modifications and alterations may be apparent. It is therefore to be understood that the examples do not limit the broadness of the aspects of the underlying invention as defined by the claims.

Definitions

As used herein "Broadcast Truck" refers to a vehicle transportable from a first location to a second location with electronic equipment capable of transmitting captured image data, audio data and video data in an electronic format, wherein the transmission is to a location remote from the location of the Broadcast Truck.

As used herein, "Image Capture Device" refers to apparatus for capturing digital image data, an Image capture device may be one or both of: a two dimensional camera (sometimes referred to as "2D") or a three dimensional camera (sometimes referred to as "3D"). In some examples an image capture device includes a charged coupled device ("CCD") camera.

As used herein, "Production Media Ingest" refers to the collection of image data and input of image data into storage for processing, such as Transcoding and Caching. Production Media Ingest may also include the collection of associated data, such a time sequence, a direction of image capture, a viewing angle, 2D or 3D image data collection.

As used herein, "Vantage Point" refers to a location of Image Data Capture in relation to a location of a performance.

As used herein, "Directional Audio" refers to audio data captured from a vantage point and from a direction such that the audio data includes at least one quality that differs from audio data captured from the vantage and a second direction or from an omni-direction capture.

As used herein, "Ambient Data" refers to data and datastreams that are not audio data or video data.

Figure 1:
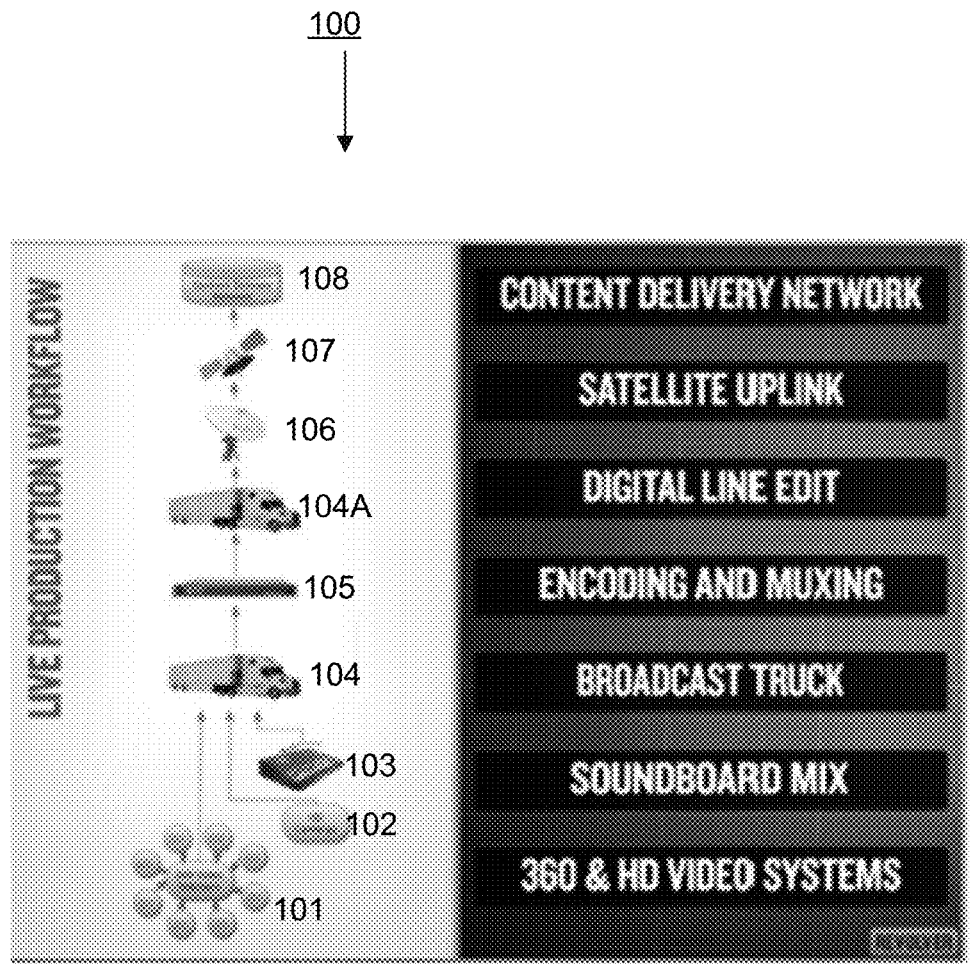
FIG. 1 illustrates a block diagram of Content Delivery Workflow according to some embodiments of the present invention.

Referring now to FIG. 1, a Live Production Workflow diagram is presented 100 with components that may be used to implement various examples of the present invention. Image capture devices, such as for example, one or both of 360 degree camera arrays 101 and high definition cameras 102 may capture image date of an event. In preferred examples, multiple vantage points each may have both a 360 degree camera array 101 and at least one high definition camera 102 capturing image data of the event. Image capture devices may be arranged for one or more of: planer image data capture; oblique image data capture; and perpendicular image data capture. Some examples may also include audio microphones to capture sound input which accompanies the captured image data.

Additional examples may include camera arrays with multiple viewing angles that are not complete 360 degree camera arrays, for example, in some examples, a camera array may include at least 120 degrees of image capture, additional examples include a camera array with at least 180 degrees of image capture; and still other examples include a camera array with at least 270 degrees of image capture. In various examples, image capture may include cameras arranged to capture image data in directions that are planar or oblique in relation to one another.

A soundboard mix 103 may be used to match recorded audio data with captured image data. In some examples, in order to maintain synchronization, an audio mix may be latency adjusted to account for the time consumed in stitching 360 degree image signals into cohesive image presentation.

A Broadcast Truck 104 includes audio and image data processing equipment enclosed within a transportable platform, such as, for example, a container mounted upon, or attachable to, a semi-truck, a rail car; container ship or other transportable platform. In some examples, a Broadcast Truck will process video signals and perform color correction. Video and audio signals may also be mastered with equipment on the Broadcast Truck to perform on-demand post-production processes.

In some examples, post processing 105 may also include one or more of: encoding; muxing and latency adjustment. By way of non-limiting example, signal based outputs of ("High Definition") HD cameras may be encoded to predetermined player specifications. In addition, 360 degree files may also be re-encoded to a specific player specification. Accordingly, various video and audio signals may be muxed together into a single digital data stream. In some examples, an automated system may be utilized to perform muxing of image data and audio data.

In some examples, a Broadcast Truck 104A or other assembly of post processing equipment may be used to allow a technical director to perform line-edit decisions and pass through to a predetermined player's autopilot support for multiple camera angles.

A satellite uplink 106 may be used to transmit post process or native image data and audio data. In some examples, by way of non-limiting example, a muxed signal may be transmitted via satellite uplink at or about 80 megabytes (Mb/s) by a commercial provider, such as, PSSI Global™ or Sureshot™ Transmissions.

In some venues, such as, for example events taking place at a sports arena a transmission may take place via Level 3 fiber optic lines, otherwise made available for sports broadcasting or other event broadcasting. Satellite Bandwidth 107 may be utilized to transmit image data and audio data to a Content Delivery Network 108.

As described further below, a Content Delivery Network 108 may include a digital communications network, such as, for example, the Internet. Other network types may include a virtual private network, a cellular network, an Internet Protocol network, or other network that is able to identify a network access device and transmit data to the network access device. Transmitted data may include, by way of example: transcoded captured image data, and associated timing data or metadata.

Figure 2:
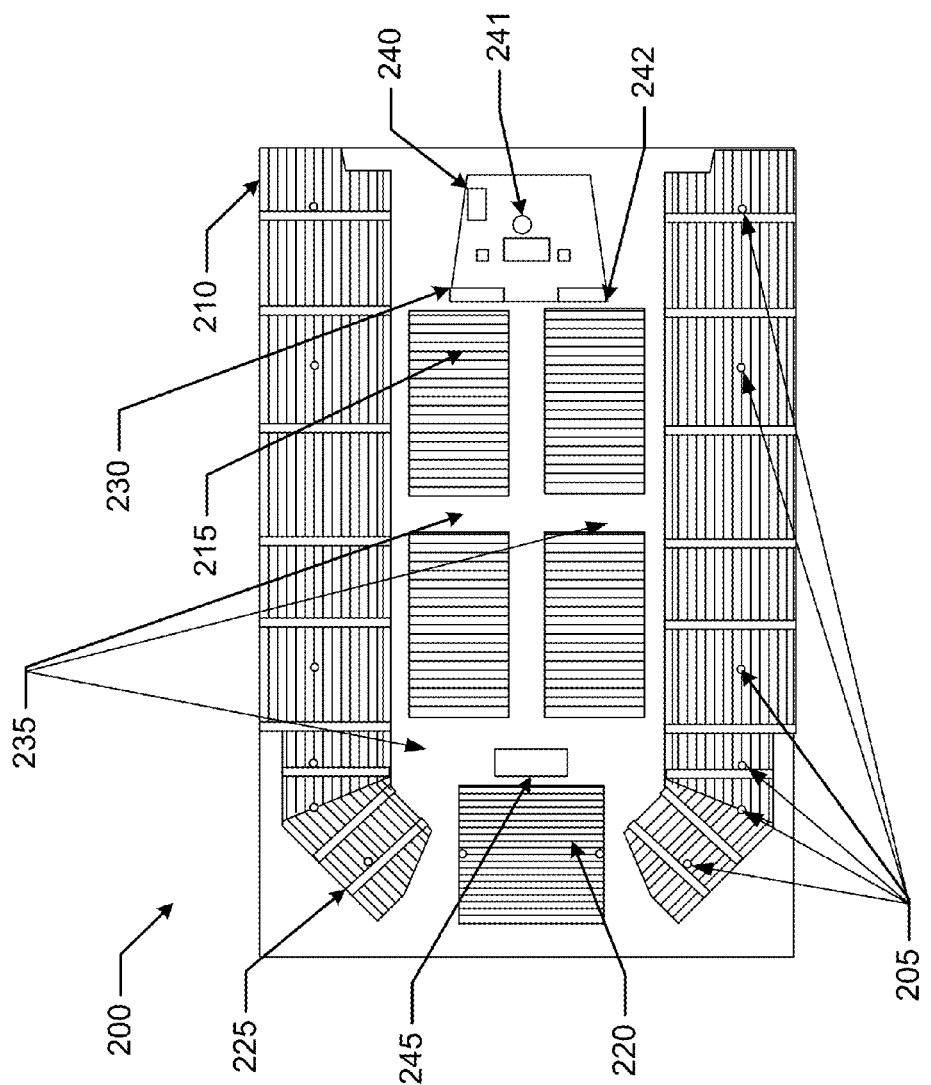
FIG. 2 illustrates an exemplary stadium venue with various features delineated in a top-down representation.

Referring to FIG. 2, a depiction of an exemplary stadium venue 200 with various features delineated may be found in a top-down representation. In a general perspective the types of venues may vary significantly and may include rock clubs, big rooms, amphitheaters, dance clubs, arenas and stadiums as non-limiting examples. Each of these venue types and perhaps each venue within a type may have differing acoustic characteristics and different important locations within a venue. Importantly to the discussions herein, each venue and venue type may have unique ambient data aspects that may be important to the nature of the performance, where ambient data refers to data or datastreams that are that data other than audio and video data. Collection of some of this data may be performed by accessing or locating equipment containing sensors of various kinds with or near specific locations used to record visual and audio during a performance. Alternatively, the collection may occur through or with the unique building and venue specific systems that support a performance.

As a start, it may be useful to consider the various types of locations that may occur in an exemplary venue. At exemplary venue 200 a depiction of a stadium venue may be found. A stadium may include a large collection of seating locations of various different types. There may be seats 215 such as those surrounding region that have an unobstructed close view to the stage 230 or other performance venue. The audio and video characteristics of these locations may be relatively pure, and ideal for audio as well since the distance from amplifying equipment is minimal. Other seats such as region 210 may have a side view of the stage 230 or in other examples the performance region. Depending on the nature of the deployment of audio amplifying equipment and of the acoustic performance of the venue setting, such side locations may receive a relatively larger amount of reflected and ambient noise aspects compared to the singular performance audio output. Some seating locations such as region 225 may have obstructions including the location of other seating regions. These obstructions may have both visual and audio relevance. A region 220 may occur that is located behind and in some cases obstructed by venue control locations such as sound and lighting control systems 245. The audio results in such locations may have impact of their proximity to the control locations. The venue may also have aisles 235 such as where pedestrian traffic may create intermittent obstruction to those seating locations there behind. The visual and acoustic and background noise aspects of various locations within a venue may be relevant to the design and placement of equipment related to the recording of both visual and audio signals of a performance.

In some examples, the location of recording devices may be designed to include different types of seating locations. There may be aspects of a stadium venue that may make a location undesirable as a design location for audio and video capture. At locations 205 numerous columns are depicted that may be present in the facility. The columns may have visual or acoustic impact but may also afford mounting locations for audio and video recording equipment where an elevated location may be established without causing an obstruction in its own right. There may be other features that may be undesirable for planned audio and video capture locations such as behind handicap access, behind aisles with high foot traffic, or in regions where external sound or other external interruptive aspects may impact a desired audio and video capture.

The stage 230 or performance region may have numerous aspects that affect audio and video collection. In some examples, the design of the stage may place performance specific effects on a specific venue. For example, the placement of speakers, such as that at location 242 may define a dominant aspect of the live audio and video experienced at a given location within the venue. The presence of performance equipment such as, in a non-limiting sense, drum equipment 241 may also create different aspects of the sound profile emanating from the stage. There may be sound control and other performance related equipment 240 on stage that may create specific audio and video and audio and video retention based considerations. It may be apparent that each venue may have specific aspects that differ from other venues even of the same type, and that the specific stage or performance layout may create performance specific aspects in addition to the venue specific aspects.

A stadium venue may have rafters and walkways at elevated positions. In some examples such elevated locations may be used to support or hang audio and video devices from. In some examples, apparatus supported from elevated support positions such as rafters may be configured to capture audio and video data while moving.

It may be apparent that specific venues of a particular venue type may have different characteristics relevant to the placement of audio and video capture apparatus. For other types of data collection, these locations for audio and video capture apparatus may be default locations. In a non-limiting sense, there may be temperature, pressure, humidity and other environmental sensors that may be collocated at the video and audio collection locations. There may be other locations as well where such environmental sensing apparatus is placed. Although, the multi-location video data streams may be useful to triangulate locations of sensing equipment, the exact location of the equipment may be calculated, sensed or measured by various techniques and may comprise other types of data that may be recorded in the recording of a performance. Environmental data as an example may provide parametric values that may be useful in algorithmic treatment of recorded data or be of interest from a historical recording perspective. There may also be control streams of data that are sent to the audio and video recording systems such as external directional signals, focusing, zoom, filtering and the like. These control signals may also comprise data streams that may be collected and recorded along a time sequence. There may be other control signals that operate during a performance, and the collection of these data streams will be discussed in later sections.

It may be further apparent that different types of venues may also have different characteristics relevant to the placement of the audio and video capture apparatus as well as the other types of data streams. In a similar vein, since the location of some ambient data collection equipment may in some examples mirror the placement of image capture apparatus, the aspects of a venue related to image capture may create default locations for other data capture. In some examples, the nature and location of regions in a specific venue, including venue installed ambient sensors, may be characterized and stored in a repository. In some examples, the venue characterization may be stored in a database. The database may be used by algorithms to present a display of a seating map of a specific venue along with the types of environmental sensors and control systems that may be found within the venue. In some examples, the display of various ambient data collection apparatus characteristics and locations may be made via a graphical display station connected to a processor.

Figure 3:
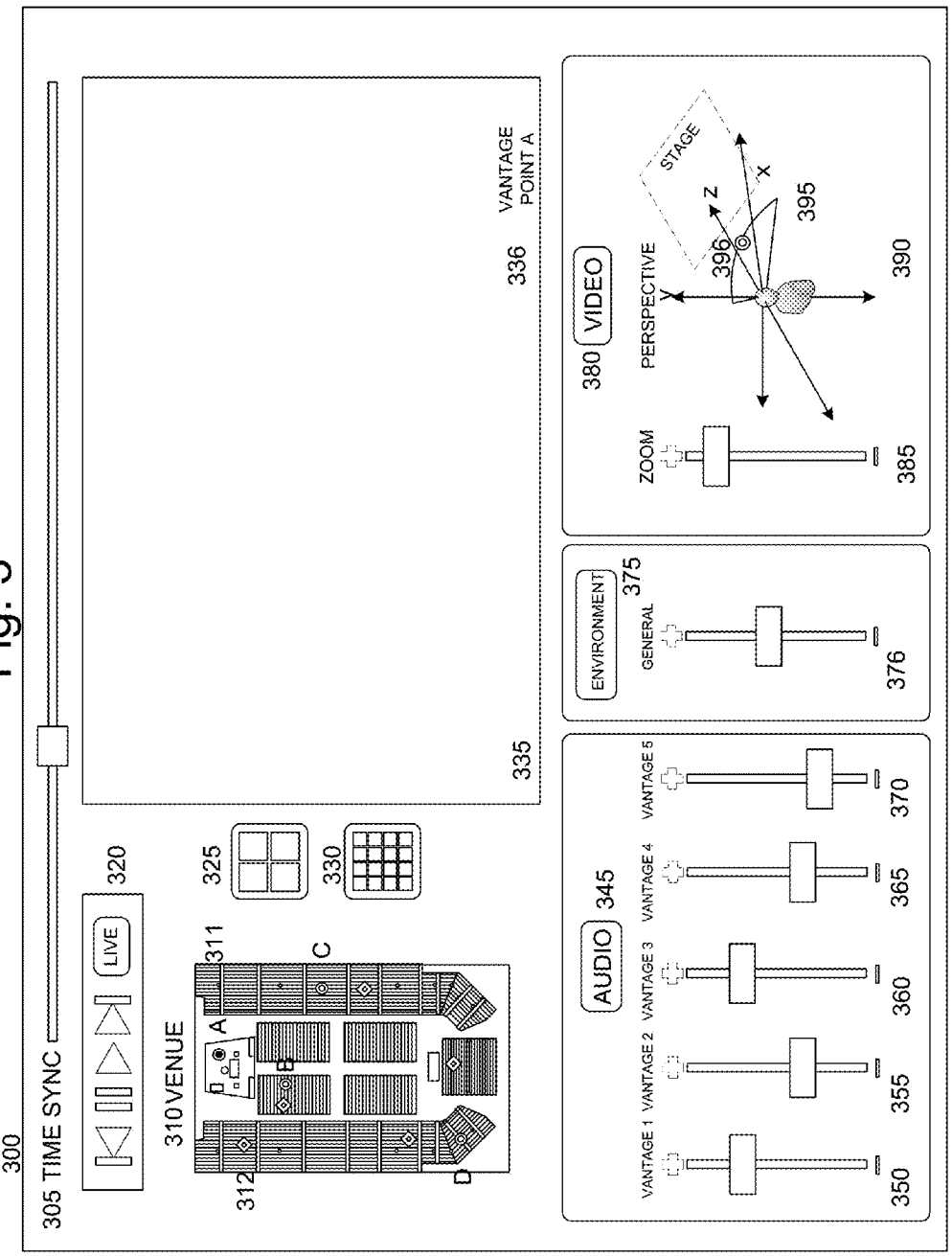
FIG. 3 illustrates an exemplary embodiment of a single screen graphical user interface (GUI) for a multi-vantage point player.

Referring now to FIG. 3, an exemplary embodiment of a single screen graphical user interface (GUI) 300 for a multi-vantage point player is illustrated. In some aspects, a user may select a single video screen 335 from a particular vantage point 336 and audio control 345 over five audio vantage points 350, 35, 360, 365, 370. The user may select general environment control 375, wherein the user may control the relative intensity of the environment feedback on a spectrum slider 376. In some embodiments, a venue diagram 310 may indicate the selected audio vantage points 312 and the selected video vantage point 311.

In some embodiments, a user may be able to navigate perspective 395 from a particular vantage point, and in some embodiments, the user may preselect multiple vantage points that the user may migrate among throughout a performance. In some aspects, the video controls 380 may comprise a zoom spectrum 385 and a perspective graph 390.

The perspective graph 390 may represent the three-dimensional space around an attendee in a specific seat. In some aspects, the central point of the axes may comprise the head of an attendee, wherein space above the attendee's head may be located along the positive y axis and the space below may be located along the negative y axis. The space in front of the attendee's head may be located along the positive z, which may be directed to the stage, and the space behind the attendee's head may be located along the negative z axis, which may be directed away from the stage. The areas to the left and right of the attendee's head may be located along the positive x axis and negative x axis, respectively. In some alternative examples, the central point may comprise a specific camera at a vantage point. In some aspects, for example where the selected video vantage point may be captured by a 360° camera, the central point may comprise the camera. In some aspects, a user may move a focal point 395 to change the viewing range 396.

A change of viewing area may trigger a change in audio because of the virtual change in ear position. In some embodiments, audio may comprise directly collected audio from specific audio feeds arranged within the venue. Alternatively, audio may comprise an algorithm-based audio derived from multiple audio feeds.

The single screen GUI 300 may present a time sync bar 305 and general player controls 320, wherein a user may control and navigate the timing of the experience. For example, a user may want to rewatch or skip certain clips within the performance. In some implementations, the presentation may be a live experience, in contrast to a rebroadcast. In some such aspects, the fast forward or skipping options may not be applicable, and the time sync bar 305 may be fluid, as the precise duration may not be known.

In some embodiments, the player may allow the user to adjust audio control 345, viewing area 396, and zoom 385 throughout the event. In other embodiments, the player may present configuration choices and samples prior to the event, allowing the user to select the configurations that may be fixed through the event.

Figure 4:
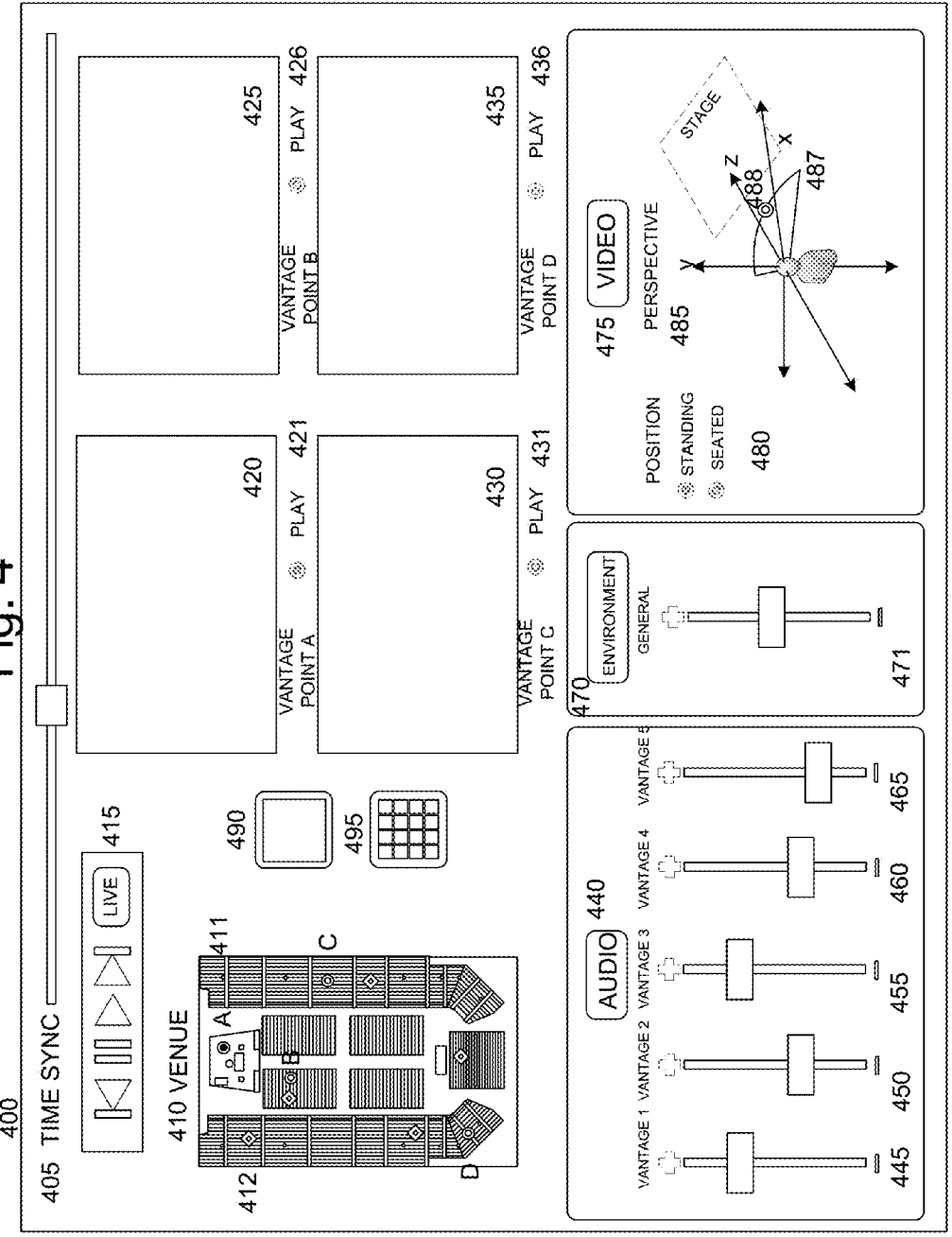
FIG. 4 illustrates an exemplary embodiment of a multiple, selected vantage point graphical user interface (GUI) for a multi-vantage point player.
Figure 5:
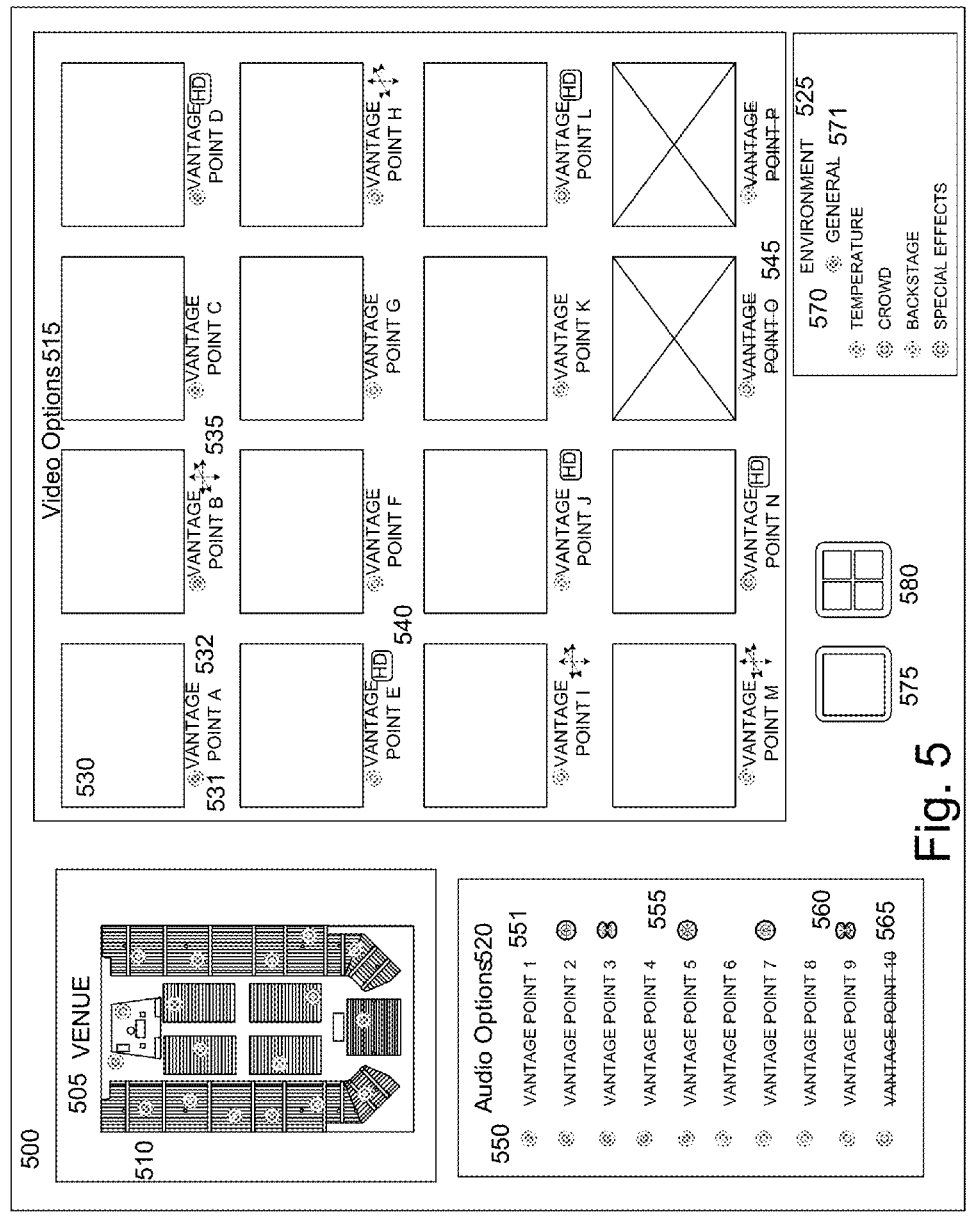
FIG. 5 illustrates an exemplary all vantage point graphical user interface (GUI) for a multi-vantage point player.

In some embodiments, a user may toggle between the GUIs 300, 400, 500 presented in FIGS. 3-5. For example, the single screen GUI 300 may present a multiple, selected vantage point GUI icon 325 and an all vantage point GUI icon 330, wherein a user may click on either icon 325, 330 to jump to the selected GUI 400, 500, respectively. Alternatively, a user may click directly on the screen 335, wherein the GUI may be specified by a right or left click. For example, a right click on the screen 335 may prompt the multiple selected vantage GUI 400, and a left click may prompt the all vantage point GUI 500.

Referring to FIG. 4, an exemplary embodiment of a multiple, selected vantage point graphical user interface (GUI) 400 for a multi-vantage point player illustrated. In contrast to the single screen GUI 300 illustrated in FIG. 3, a multiple, selected vantage point GUI 400 may allow a user to view multiple screens from different selected vantage points simultaneously. The control layout may be similar to the single screen GUI 300, wherein a venue diagram 410 may indicate the selected video vantage points 411 and the selected audio vantage points 412.

In some aspects, the video controls 475 may comprise a position choice 480 and a perspective graph 485. The position choice 480 may allow a user to experience the live event from a standing or seated position. As described in FIG. 3, the perspective graph 485 may represent the three-dimensional space around an attendee in a specific. In some aspects, for example where the selected video vantage point may be captured by a 360° camera, the central point may comprise the camera. In some aspects, a user may move a focal point 488 to change the viewing range 487.

In some aspects, the GUI 400 may present multiple screens 420, 425, 430, 435. In some aspects, where a user may experience an event from multiple vantage points simultaneously, the GUI 400 may simultaneously present screens 420, 425, 430, 435 captured or streaming video from each vantage point 421, 426, 431, 436. In other aspects, a user may experience an event from multiple vantage points in succession, wherein one screen may actively play or stream video at any one time.

In some embodiments, a user may individually configure settings for each video vantage point. In some aspects, a user may toggle control between each of the screens 420, 425, 430, 435, wherein a user may configure the settings for a selected video vantage point. A user may configure video control 475, environment control 470, and audio control 440 for a particular video vantage point. For example, for each video vantage point, the user may specify a volume level for audio from each selected audio vantage point 445, 450, 455, 460, 465; may specify the intensity of special effects data 471; and may specify the position and viewing range 487.

In some embodiments, the multiple, selected vantage point GUI 400 may present a time sync bar 305 and a master player control 415, wherein a user may control all content simultaneously. Alternatively or in combination with a master player control 415, each control segment may have a general control comprising, for example, icons for play, pause, rewind, and fast forward.

In some aspects, the multiple, selected vantage point GUI 400 may present a single screen GUI icon 490 and an all vantage point GUI icon 495, wherein a user may toggle between the GUI options. Alternatively, a user may right click to prompt the all vantage point GUI 500 or left click to prompt the single screen GUI 300. In some aspects, prompting the single screen GUI 300 may default to the preselected vantage point screen, or a user may be prompted to select the desired vantage point from the current multiple, selected GUI 400.

Referring now to FIG. 5, an exemplary all vantage point graphical user interface (GUI) 500 for a multi-vantage point player is illustrated. In some embodiments, the all vantage point GUI 500 may present a user with video options 515, audio options 520, environment options 525, and a venue diagram 505, wherein each video and/or audio vantage point 510 may be indicated. In some embodiments, the player may limit the number of video and audio vantage points a user may control and/or view/listen to at one time.

In some aspects, the video options 515 may present a grid of screens 530, wherein a user may select screens 530 from one or more video vantage points 532, such as, for example, by toggling a radio button 531. In some embodiments, the video feed samples displayed for each vantage point may be extracted from a stock exemplary event or may be played live from the event. In some implementations, the user may be able to further control the perspective from a vantage point, which may be an option in a second GUI, such as illustrated in FIGS. 3 and 4. In some embodiments, the user may preselect from a variety of vantage points, which may allow the user to migrate between the vantage points during the concert. In some embodiments, the player may allow a user to view the event from multiple vantage points simultaneously, such as described and illustrated in FIG. 4.

In some embodiments, video capture may be achieved through use of a variety of types of cameras, wherein some cameras may capture high definition imagery and/or a 360° view. In such embodiments, the all vantage point GUI 500 may indicate camera capabilities for each vantage point, such as with an "HD" 540 or a three-axis icon 535. In some embodiments, some cameras may not be active for every event, and an inactive vantage point may be indicated by a faded screen or an x over a screen and a strike through the vantage point title 545.

In some aspects, the audio options 520 may present a list of the audio vantage points 551, wherein a user may select audio from one or more audio vantage points 551, such as, for example, by toggling a radio button 550. In some embodiments, the specific vantage point 551 may be clickable, wherein a click may temporarily activate the audio from that vantage point 551. Alternatively, not shown, an all vantage point GUI 500 may present a play button next to each vantage point 551, which may trigger an audio sample. In some embodiments, the sample may be extracted from a stock exemplary event or may be played live from the event. In some implementations, some microphones may not be active for every event, wherein an inactive vantage point may be indicated by a strike through 565.

In some embodiments, the audio may be achieved through a variety of microphones, wherein the microphones may capture unidirectional, bidirectional, or omnidirectional audio. In such implementations, the audio options 520 may indicate special microphone capabilities with a bidirectional icon or an omnidirectional icon, for example. In such example, the unidirectional audio capture may be the default and may not require a microphone capability icon.

In some implementations, environment options 525 may present the different environmental data types 571 captured for the particular venue, which may comprise ambient, video, and/or audio data. For example, crowd noise or backstage noise may be captured as audio, special effects may be captured as audio in conjunction with video, and temperature may be captured as ambient data. Alternatively, a user may select general control 570 over environmental data, wherein a user may control the intensity of the presentation of environmental data as a whole or according to a predefined algorithm.

Similarly to the single screen GUI 300 and the multiple, selected vantage point GUI 400, the all vantage point GUI 500 may present alternate GUI icons 575, 580 so that a user may toggle between GUIs 300, 400, 500. The all vantage point GUI 300 may present a single screen GUI icon 575 and a multiple, selected vantage point GUI icon 580. In some embodiments, a user may be prompted to select the desired vantage points, whereas in other embodiments, the player may assume the selected or last selected vantage points may be the desired vantage points.

Apparatus

Figure 6:
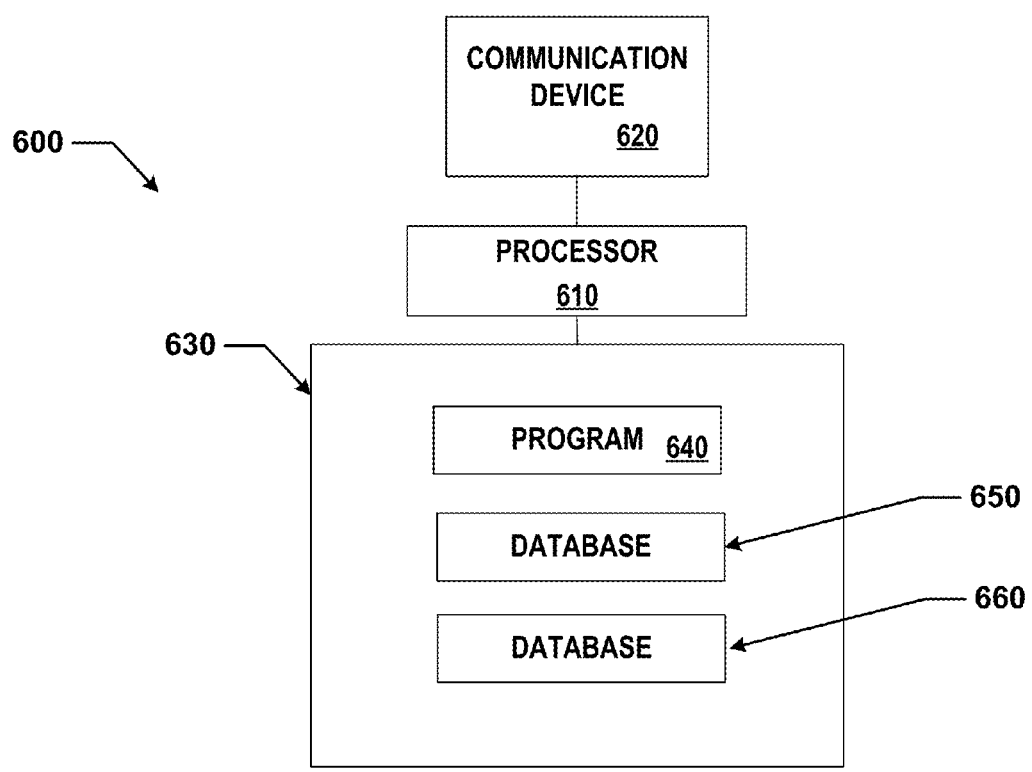
FIG. 6 illustrates apparatus that may be used to implement aspects of the present invention including executable software.

In addition, FIG. 6 illustrates a controller 600 that may be utilized to implement some embodiments of the present invention. The controller may be included in one or more of the apparatus described above, such as the Revolver Server, and the Network Access Device. The controller 600 comprises a processor unit 610, such as one or more semiconductor based processors, coupled to a communication device 620 configured to communicate via a communication network (not shown in FIG. 6). The communication device 620 may be used to communicate, for example, with one or more online devices, such as a personal computer, laptop, or a handheld device.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a software program 640 for controlling the processor 610. The processor 610 performs instructions of the software program 640, and thereby operates in accordance with the present invention. The processor 610 may also cause the communication device 620 to transmit information, including, in some instances, control commands to operate apparatus to implement the processes described above. The storage device 630 can additionally store related data in a database 650 and database 660, as needed.

Figure 7:
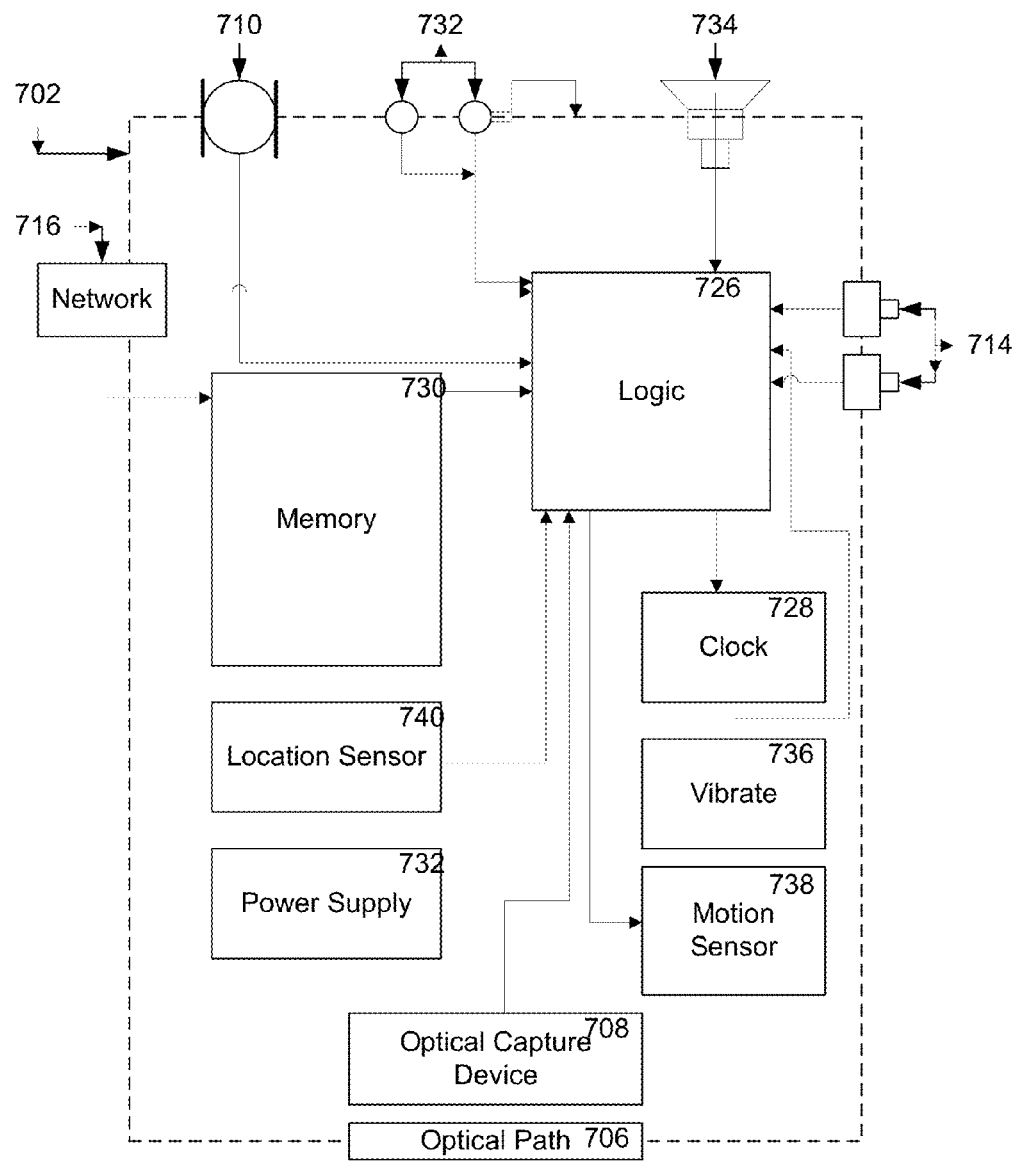
FIG. 7 illustrates an exemplary handheld device that may be used to implement aspects of the present invention including executable software.

Referring now to FIG. 7, a block diagram of an exemplary mobile device 702. The mobile device 702 comprises an optical capture device 708 to capture an image and convert it to machine-compatible data, and an optical path 706, typically a lens, an aperture or an image conduit to convey the image from the rendered document to the optical capture device 708. The optical capture device 708 may incorporate a Charge-Coupled Device (CCD), a Complementary Metal Oxide Semiconductor (CMOS) imaging device, or an optical sensor of another type.

A microphone 710 and associated circuitry may convert the sound of the environment, including spoken words, into machine-compatible signals. Input facilities 714 exist in the form of buttons, scroll wheels, or other tactile sensors such as touch-pads. In some embodiments, input facilities 714 may include a touchscreen display.

Visual feedback 732 to the user is possible through a visual display, touchscreen display, or indicator lights. Audible feedback 734 may come from a loudspeaker or other audio transducer. Tactile feedback may come from a vibrate module 736.

A motion sensor 738 and associated circuity convert the motion of the mobile device 702 into machine-compatible signals. The motion sensor 738 may comprise an accelerometer that may be used to sense measurable physical acceleration, orientation, vibration, and other movements. In some embodiments the motion sensor 738 may include a gyroscope or other device to sense different motions.

A location sensor 740 and associated circuitry may be used to determine the location of the device. The location sensor 740 may detect Global Position System (GPS) radio signals from satellites or may also use assisted GPS where the mobile device may use a cellular network to decrease the time necessary to determine location. In some embodiments, the location sensor 740 may use radio waves to determine the distance from known radio sources such as cellular towers to determine the location of the mobile device 702. In some embodiments these radio signals may be used in addition to GPS.

The mobile device 702 comprises logic 726 to interact with the various other components, possibly processing the received signals into different formats and/or interpretations. Logic 726 may be operable to read and write data and program instructions stored in associated storage 730 such as RAM, ROM, flash, or other suitable memory. It may read a time signal from the clock unit 728. In some embodiments, the mobile device 702 may have an on-board power supply 732. In other embodiments, the mobile device 702 may be powered from a tethered connection to another device, such as a Universal Serial Bus (USB) connection.

The mobile device 702 also includes a network interface 716 to communicate data to a network and/or an associated computing device. Network interface 716 may provide two-way data communication. For example, network interface 716 may operate according to the internet protocol. As another example, network interface 716 may be a local area network (LAN) card allowing a data communication connection to a compatible LAN. As another example, network interface 716 may be a cellular antennae and associated circuitry which may allow the mobile device to communicate over standard wireless data communication networks. In some implementations, network interface 716 may include a Universal Serial Bus (USB) to supply power or transmit data. In some embodiments other wireless links may also be implemented.

As an example of one use of mobile device 702, a reader may scan some text from a newspaper article with mobile device 702. The text is scanned as a bit-mapped image via the optical capture device 708. Logic 726 causes the bit-mapped image to be stored in memory 730 with an associated time-stamp read from the clock unit 728. Logic 726 may also perform optical character recognition (OCR) or other post-scan processing on the bit-mapped image to convert it to text. Logic 726 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 726) to an associated computer via network interface 716.

As an example of another use of mobile device 702, a reader may capture some text from an article as an audio file by using microphone 710 as an acoustic capture port. Logic 726 causes audio file to be stored in memory 728. Logic 726 may also perform voice recognition or other post-scan processing on the audio file to convert it to text. As above, the reader may then upload the audio file (or text produced by post-scan processing performed by logic 726) to an associated computer via network interface 716.

Figure 8A:
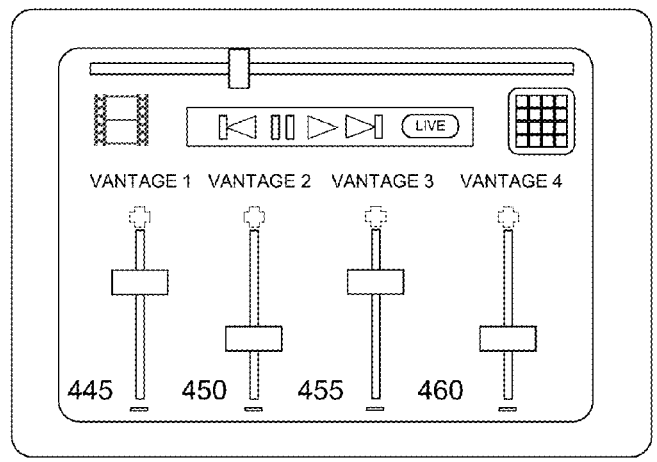
FIG. 8A illustrates an exemplary embodiment of an audio graphical user interface (GUI) for a handheld multi-vantage point player.
Figure 8B:
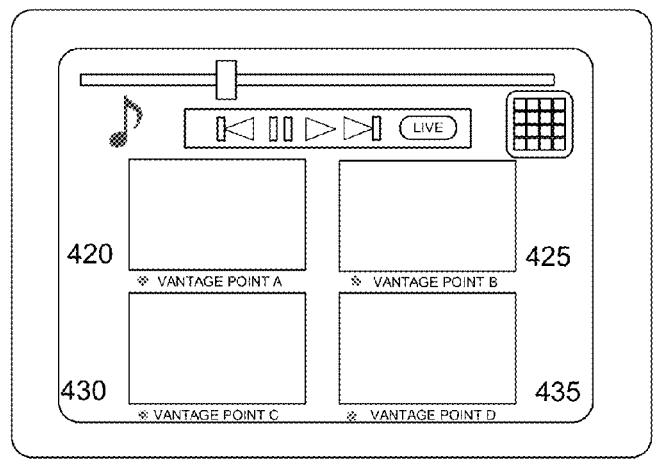
FIG. 8B illustrates an exemplary embodiment of an image data graphical user interface (GUI) for a handheld multi-vantage point player.
Figure 8C:
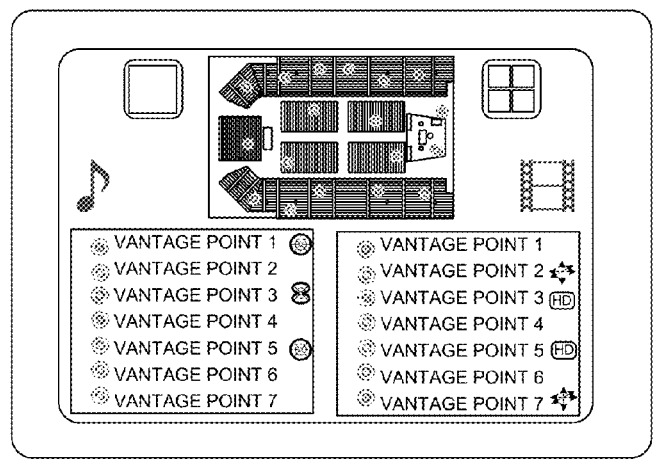
FIG. 8C illustrates an exemplary embodiment of a venue graphical user interface (GUI) for a handheld multi-vantage point player.

Referring now to FIGS. 8A-8C, exemplary graphical user interfaces for experience control for a handheld device are illustrated. In some embodiments, a user may be able to toggle between audio GUI 800 and video GUI 820, which may allow for higher visibility and more convenient control in comparison to a simultaneous video and audio control presentation. In some alternative aspects, the user may select simple controls, wherein both video and audio control may be accessible from the same screen. As illustrated in FIG. 8C, selection of the image and audio vantage points may be presented on a venue GUI 850.

In still further embodiments, the video and audio control options may be selected, such as illustrated and described in reference to FIG. 5. In some aspects, the mobile device may comprise a touch responsive screen, wherein a user may adjust the video controls by interacting directly with the screen, such as through recognized gestures. For example, a user may control the zoom level by pinching the screen and may control the viewing area by swiping the screen.

In some embodiments, a user may toggle between video control and audio control. In some such embodiments, the toggle may be controllable through eye movement recognition, similarly to finger gestures that may control a mobile device.

In some embodiments, the handheld device may be in logical communication with a secondary device, such as a remote or mobile device. The secondary device may control one or both the audio or video. In some embodiments, a remote may comprise control functions based on differentiating tactile indicators. Tactile differentiation may allow a user to utilize a remote without having to interrupt the immersive experience. In some embodiments, tactile indicators may be programmed into a mobile device, such as a tablet or smartphone, wherein the mobile device may vibrate in a predetermined pattern based on the specific controls. For example, a mobile device may vibrate twice in quick succession to indicate to the user that he has activated the immersion audio control. The user may then move their finger up or down to control the balance. In some embodiments, the relative motion of the finger on the mobile device may adjust the audio, wherein the user may not be required to touch a specific point on the mobile device. Such embodiments may be convenient for mobile devices where the screen may be smooth, without tactile distinctive portions.

Referring now to FIG. 9, exemplary perspective graphs comprising three separate perspective points, wherein the three perspective graphs may illustrate horizontal movement of a handheld device, according to some embodiments of the present disclosure, are illustrated. In some embodiments, the handheld device may comprise an accelerometer configured to detect movement. Similarly to the eye position detection, the accelerometer may be calibrated to the natural head movements of a user. In some embodiments, the calibration may allow the user to tailor the range to the desired viewing area. For example, a user may be able to move their head 110° comfortably, and the calibration may allow the user to view the entire 180° relative the natural 110° movement.

A neutral position 920 of the handheld device may allow the user to view a forward-looking perspective 925. A right position 940 of the handheld device may allow the user to view a rightward-looking perspective 945. A left position 960 of the handheld device may allow the user to view a leftward-looking perspective 965.

Figure 10:
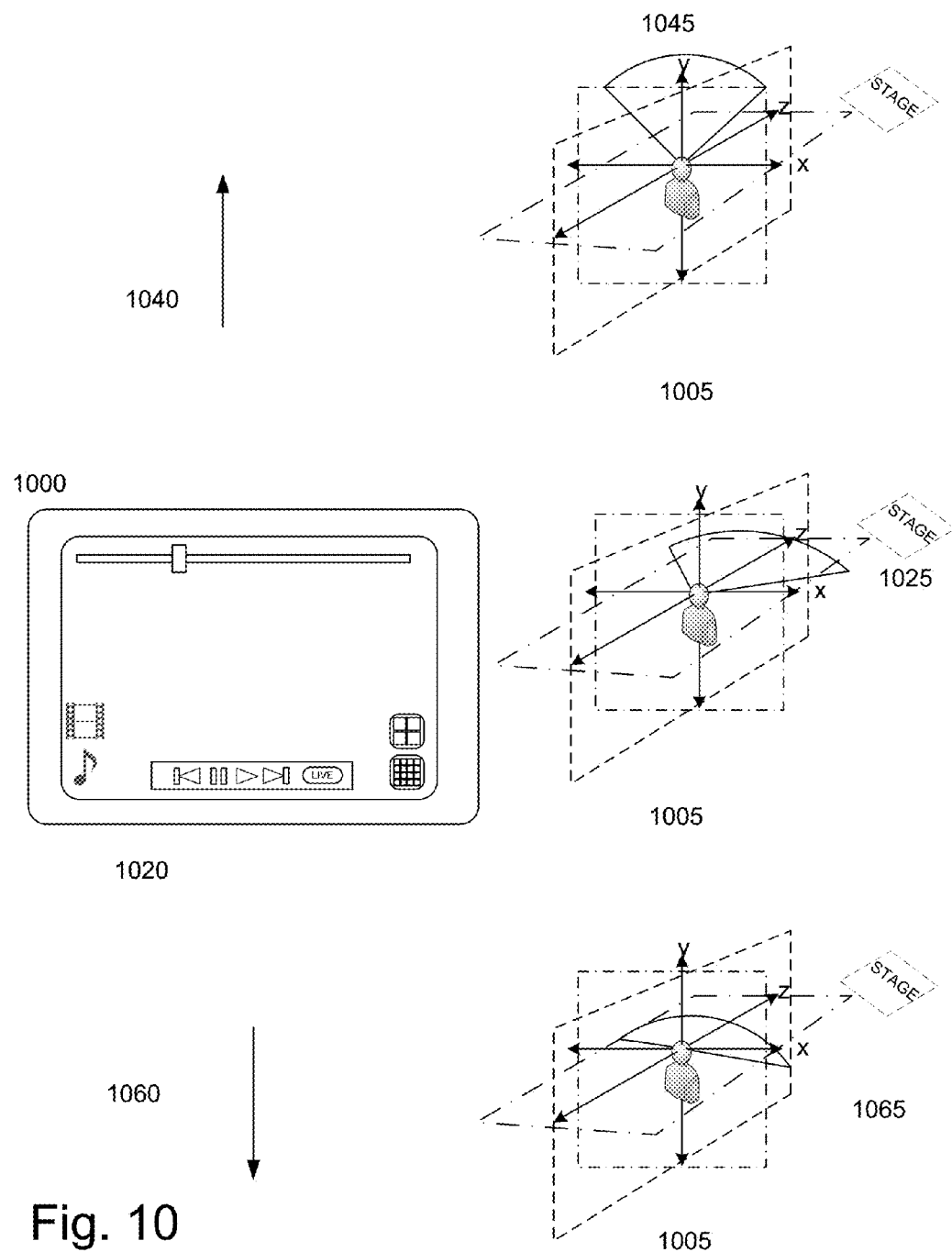
FIG. 10 exemplary perspective graphs comprising three separate perspective points, wherein the three perspective graphs may illustrate vertical movement of a handheld device, according to some embodiments of the present disclosure.

Referring now to FIG. 10, exemplary perspective graphs comprising three separate perspective points, wherein the three perspective graphs may illustrate horizontal movement of a handheld device, according to some embodiments of the present disclosure, are illustrated. In some embodiments, the handheld device may be configured to detect vertical motions. In some aspects, a user may move the handheld device up to shift the viewing area to a range in the positive y axis grids, and user may move the handheld device down to shift the viewing area to a range in the negative y axis grids. In some embodiments, the handheld device may be configured to detect both horizontal and vertical motion, wherein the user may be able to have almost a 270° viewing range.

A neutral position 1020 of the handheld device may allow the user to view a forward-looking perspective 1025. An up position 1040 of the handheld device may allow the user to view an upward-looking perspective 1045. A down position 1060 of the handheld device may allow the user to view a downward-looking perspective 1065.

In still further embodiments, the handheld device may be able to detect 360° of horizontal movement, wherein the user may completely turn around and change the neutral viewing range by 180°. In some aspects, the handheld device may be configured to detect whether the user may be sitting or standing, which may shift the perspective and viewing area. In some implementations, a user may be allowed to activate or deactivate the motion detection levels, based on preference and need. For example, a user may want to shift between sitting and standing throughout the experience without a shift in perspective. In some implementations, the handheld device may further comprise speakers, wherein audio data may be directed to the user.

In some aspects, a handheld device may operate similarly to the wearable display device, wherein a user may control the viewing area and perspective by moving the handheld device. In some embodiments, the player may utilize accelerometers included in the handheld device. Alternatively, a user may attach a dongle In some aspects, a user may be prompted to calibrate the display mechanism, wherein the calibration may establish a comfortable neutral position. In some aspects, particularly for handheld devices, the calibration may occur prior to a live event or even during, such as when a user may move to a different location with the device.

In some aspects, the video options may allow the user to select views from one or more vantage points, such as, for example, by toggling a radio button. In some implementations, the user may be able to further control the perspective from a vantage point, which may be an option in a second GUI, such as illustrated in FIGS. 6 and 7.

SPECIFIC EXAMPLES OF EQUIPMENT

Apparatus described herein may be included, for example in one or more smart devices such as, for example: a mobile phone, tablet or traditional computer such as laptop or microcomputer or an Internet ready TV.

The above described platform may be used to implement various features and systems available to users. For example, in some embodiments, a user will provide all or most navigation. Software, which is executable upon demand, may be used in conjunction with a processor to provide seamless navigation of 360/3D/panoramic video footage with Directional Audio—switching between multiple 360/3D/panoramic cameras and user will be able to experience a continuous audio and video experience.

Additional embodiments may include the system described automatic predetermined navigation amongst multiple 360/3D/panoramic cameras. Navigation may be automatic to the end user but the experience either controlled by the director or producer or some other designated staff based on their own judgment.

Still other embodiments allow a user to participate in the design and placement of imaging recording equipment for a specific performance at a specific venue. Once the image capture apparatus is placed and placed in use a user may record a user defined sequence of image and audio content with navigation of 360/3D/panoramic video footage, Directional Audio, switching between multiple 360/3D/panoramic cameras. In some embodiments, user defined recordations may include audio, text or image data overlays. A user may thereby act as a producer with the Multi-Vantage point data, including directional video and audio data and record a User Produced multimedia segment of a performance. The User Produced may be made available via a distributed network, such as the Internet for viewers to view, and, in some embodiments further edit the multimedia segments themselves.

Directional Audio may be captured via an apparatus that is located at a Vantage Point and records audio from a directional perspective, such as a directional microphone in electrical communication with an audio storage device. Other apparatus that is not directional, such as an omni directional microphone may also be used to capture and record a stream of audio data; however such data is not directional audio data. A user may be provided a choice of audio streams captured from a particular vantage point at particular time in a sequence.

In some embodiments a User may have manual control in auto mode. The User is able to manually control by actions such as swipe or equivalent to switch between MVPs or between HD and 360. In still further embodiments, a user may interact with a graphical depiction of a specific venue where image capture elements have been indicated thereupon.

In some additional embodiments, an Auto launch Mobile Remote App may launch as soon as video is transferred from iPad to TV using Apple Airplay. Using tools, such as, for example, Apple's Airplay technology, a user may stream a video feed from iPad or iPhone to a TV which is connected to Apple TV. When a user moves the video stream to TV, automatically mobile remote application launches on iPad or iPhone is connected/synched to the system. Computer Systems may be used to displays video streams and switches seamlessly between 360/3D/Panoramic videos and High Definition (HD) videos.

In some embodiments that implement Manual control, executable software allows a user to switch between 360/3D/Panoramic video and High Definition (HD) video without interruptions to a viewing experience of the user. The user is able to switch between HD and any of the multiple vantage points coming as part of the panoramic video footage.

In some embodiments that implement Automatic control a computer implemented method (software) that allows its users to experience seamlessly navigation between 360/3D/Panoramic video and HD video. Navigation is either controlled a producer or director or a trained technician based on their own judgment.

Manual Control and Manual Control systems may be run on a portable computer such as a mobile phone, tablet or traditional computer such as laptop or microcomputer. In various embodiments, functionality may include: Panoramic Video Interactivity, Tag human and inanimate objects in panoramic video footage; interactivity for the user in tagging humans as well as inanimate objects; sharing of these tags in real time with other friends or followers in your social network/social graph; Panoramic Image Slices to provide the ability to slice images/photos out of Panoramic videos; real time processing that allows users to slice images of any size from panoramic video footage over a computer; allowing users to purchase objects or items of interest in an interactive panoramic video footage; ability to share panoramic images slides from panoramic videos via email, sms (smart message service) or through social networks; share or send panoramic images to other users of a similar application or via the use of SMS, email, and social network sharing; ability to "tag" human and inanimate objects within Panoramic Image slices; real time "tagging" of human and inanimate objects in the panoramic image; allowing users to purchase objects or items of interest in an interactive panoramic video footage; content and commerce layer on top of the video footage—that recognizes objects that are already tagged for purchase or adding to user's wish list; ability to compare footage from various camera sources in real time; real time comparison panoramic video footage from multiple cameras captured by multiple users or otherwise to identify the best footage based on aspects such as visual clarity, audio clarity, lighting, focus and other details; recognition of unique users based on the user's devices that are used for capturing the video footage (brand, model #, MAC address, IP address, etc.); radar navigation of which camera footage is being displayed on the screens amongst many other sources of camera feeds; navigation matrix of panoramic video viewports that in a particular geographic location or venue; user generated content that can be embedded on top of the panoramic video that maps exactly to the time codes of video feeds; time code mapping done between production quality video feed and user generated video feeds; user interactivity with the ability to remotely vote for a song or an act/song while watching a panoramic video and effect outcome at venue. Software allows for interactivity on the user front and also ability to aggregate the feedback in a backend platform that is accessible by individuals who can act on the interactive data; ability to offer "bidding" capability to panoramic video audience over a computer network, bidding will have aspects of gamification wherein results may be based on multiple user participation (triggers based on conditions such # of bids, type of bids, timing); Heads Up Display (HUD) with a display that identifies animate and inanimate objects in the live video feed wherein identification may be tracked at an end server and associated data made available to front end clients.

CONCLUSION

A number of embodiments of the present invention have been described. While this specification contains many specific implementation details, there should not be construed as limitations on the scope of any inventions or of what may be claimed, but rather as descriptions of features specific to particular embodiments of the present invention.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed invention.

What is claimed is:

1. A handheld multi-vantage point player to be held in the hand of a user comprising:
    a display;
    an accelerometer fixedly attached to the wearable display calibrated to detect hand movement;
    a control system configured to access a server in logical communication with a communications network, wherein the control system is configured to accept and register a plurality of finger gestures, wherein the plurality of finger gestures comprise predefined tactile motions; and
    executable software stored on the control system and executable on demand, the software operative with the control system to cause the control system to:
        provide image vantage point control comprising logical control over captured image data, captured from a plurality of image vantage points within a venue during a performance event, which cameras are placed according to venue-specific historical data;
        prompt selection of multiple image vantage points;
        receive input selection designating one of the multiple image vantage points;
        register a neutral hand position of the user comprising a central point of a three axes space around the hand position comprising a positive Y axis above the hand, a negative Y axis below the hand, a positive Z direction towards a stage, a negative Z direction away from the stage, and areas to the left and right of the hand comprising an X axis;
        register a current hand position of the user in relation to the neutral hand position with an initial X axis value, Y axis value, and Z axis value;
        access the server, wherein the server is configured to store the captured image data for the performance event;
        retrieve image data captured with a 360 degree camera and correlating to the X axis, Y axis, and Z axis from the server based upon the designated image vantage point and the current hand position of the user in relation to the neutral hand position and 360 degree camera and correlating to the X axis, Y axis, and Z axis; and
        display the captured image data retrieved from the server based upon the designated image vantage points, the X axis, Y axis, and Z axis and the current hand position of the user, designating respective values for each of the X axis, Y axis, and Z axis.

2. The handheld multi-vantage point player of claim 1, wherein the control system is further caused to:

provide audio vantage point control comprising logical control over captured audio data, captured from a plurality of audio vantage points within the venue during the performance event, which audio vantage points are chosen according to venue-specific historical data;

prompt selection of one or more audio vantage points;

receive input selection of the one or more audio vantage points;

access the server, wherein the server is configured to store the captured audio data for the performance event;

retrieve audio data captured from the one or more selected audio vantage points; and play the captured audio data of selected audio vantage points.

3. The handheld multi-vantage point player of claim 2, wherein the selection of one or more audio vantage points is predefined by a third party.

4. The handheld multi-vantage point player of claim 2, wherein the selection of one or more audio vantage points is controllable by the user.

5. The multi-vantage point player of claim 2, wherein the image vantage point control further comprises a change in perspective based upon the accelerometer communicating to the processor a movement of the handheld display; and the processor is additionally operative to display new image data based upon the movement of the wearable display.

6. The multi-vantage point player of claim 5, wherein the perspective control comprises a zoom control and a positive change in a y-axis of viewing area based upon the user changing a hand position towards looking up, and a negative change in a y-axis viewing area based upon the user changing a hand position towards looking down; and a positive change in an x-axis based upon the user changing a hand position towards aiming the device to the right and a negative change in the x-axis based upon the user changing a hand position towards aiming the device to the left.

7. The handheld multi-vantage point player of claim 5, further comprising an accelerometer logically linked to the control system, wherein the accelerometer is configured to detect movement of the handheld multi-vantage point player.

8. The handheld multi-vantage point player of claim 7, wherein the image data display is controllable by detected movement of the handheld multi-vantage point player.

9. The handheld multi-vantage point player of claim 1, wherein the control system is further caused to disable at least one application concurrently with the display of the captured image data.

10. The handheld multi-vantage point player of claim 1, wherein the handheld multi-vantage point player comprises a smartphone.

11. The handheld multi-vantage point player of claim 1, wherein the handheld multi-vantage point player comprises a tablet.

12. The handheld multi-vantage point player of claim 1, wherein the handheld multi-vantage point player comprises a handheld gaming device.

13. The handheld multi-vantage point player of claim 1, wherein the handheld multi-vantage point player, while streaming a live performance of a concert, occasionally prompts the user to bid on a song the user would like the performer to perform, wherein the bid comprises at least one of: a vote, or a specified amount of money.

14. The handheld multi-vantage point player of claim 6, wherein the executable software is further configured to associate captured audio and video data with a time index.

15. The handheld multi-vantage point player of claim 14, wherein the handheld multi-vantage point player is configured to display captured audio and video data at a selected time index from a selected vantage point, based upon changes in acceleration detected by the accelerometer.

* * * * *